US011656659B2

(12) United States Patent
Choi

(10) Patent No.: US 11,656,659 B2
(45) Date of Patent: May 23, 2023

(54) PORTABLE INFORMATION HANDLING SYSTEM HINGE WITH HYBRID ROTATION FOR DISTRIBUTED TORQUE

(71) Applicant: Dell Products L.P., Round Rock, TX (US)

(72) Inventor: Duck Soo Choi, Georgetown, TX (US)

(73) Assignee: Dell Products L.P., Round Rock, TX (US)

(*) Notice: Subject to any disclaimer, the term of this patent is extended or adjusted under 35 U.S.C. 154(b) by 179 days.

(21) Appl. No.: 17/171,255

(22) Filed: Feb. 9, 2021

(65) Prior Publication Data
US 2022/0253110 A1   Aug. 11, 2022

(51) Int. Cl.
| G06F 1/16 | (2006.01) |
| E05D 3/18 | (2006.01) |
| E05D 11/08 | (2006.01) |
| E05D 3/12 | (2006.01) |

(52) U.S. Cl.
CPC ............ G06F 1/1681 (2013.01); *E05D 3/122* (2013.01); *E05D 3/18* (2013.01); *E05D 11/087* (2013.01); *E05Y 2201/218* (2013.01); *E05Y 2201/26* (2013.01); *E05Y 2900/606* (2013.01); *G06F 1/1616* (2013.01)

(58) Field of Classification Search
CPC combination set(s) only.
See application file for complete search history.

(56) References Cited

U.S. PATENT DOCUMENTS

| 9,477,269 | B2 | 10/2016 | Morrison et al. |
| 9,954,985 | B2 | 4/2018 | Xu |
| 10,317,934 | B2 | 6/2019 | Hampton et al. |
| 10,429,904 | B2 | 10/2019 | Turchin et al. |
| 10,558,245 | B2* | 2/2020 | Morrison ............. G06F 1/1637 |
| 10,725,505 | B1* | 7/2020 | Hallar ...................... E05D 7/00 |
| 10,760,311 | B2* | 9/2020 | Regimbal ............. G06F 1/1681 |
| 10,852,776 | B1* | 12/2020 | Morrison ............ E05D 11/1028 |
| 10,860,068 | B2* | 12/2020 | Brocklesby ............. G06F 1/166 |
| 10,928,864 | B1* | 2/2021 | Sanchez ................ G06F 1/1681 |
| 11,009,919 | B2* | 5/2021 | Hsu ........................ F16C 11/04 |
| 11,016,539 | B2* | 5/2021 | Hallar ................... G06F 1/1618 |
| 11,016,540 | B2* | 5/2021 | Hallar ................... G06F 1/1618 |
| 11,019,742 | B2* | 5/2021 | Hsu ......................... E05D 3/122 |
| 11,093,008 | B2* | 8/2021 | Hallar ................. E05D 11/1028 |
| 11,099,611 | B2* | 8/2021 | Hallar ................... G06F 1/1618 |
| 11,243,578 | B2* | 2/2022 | Torres ................... G06F 1/1616 |
| 11,294,431 | B2* | 4/2022 | Torres ................... G06F 1/1681 |

(Continued)

*Primary Examiner* — Lisa Lea-Edmonds
(74) *Attorney, Agent, or Firm* — Zagorin Cave LLP; Robert W. Holland

(57) ABSTRACT

A portable information handling system housing rotationally couples housing portions with a dual axis synchronized gear to rotate about parallel spaced axes that define a radius to support folding of a flexible display. Each axis of the synchronized gear couples to a housing portion with a sliding bracket that adjusts length during rotation. Plural pivot arms couple to a main body of the hinge at the first and second axes and to the housing portions to manage spacing of the housing portions during rotation. A sliding member coupled to the main body engages with the plural pivot arms to synchronize rotation of the plural pivot arms and regulate torsional forces related to rotation of the housing portions that can damage a display film folding at the hinge.

9 Claims, 4 Drawing Sheets

(56) References Cited

U.S. PATENT DOCUMENTS

| | | | |
|---|---|---|---|
| 2019/0243426 A1* | 8/2019 | Morrison | G06F 1/1618 |
| 2020/0133351 A1 | 4/2020 | Gault et al. | |
| 2020/0362608 A1* | 11/2020 | Regimbal | G06F 1/1681 |
| 2021/0034116 A1* | 2/2021 | Torres | G06F 1/1616 |
| 2021/0034117 A1* | 2/2021 | Torres | G06F 1/1616 |
| 2021/0096607 A1* | 4/2021 | Hallar | G06F 1/1681 |
| 2021/0096608 A1* | 4/2021 | Hallar | E05D 11/1028 |
| 2021/0096609 A1* | 4/2021 | Hallar | G06F 1/1681 |
| 2021/0096610 A1* | 4/2021 | Hallar | G06F 1/1616 |
| 2021/0165466 A1* | 6/2021 | Kang | G06F 1/1652 |
| 2021/0247816 A1* | 8/2021 | Hallar | G06F 1/1618 |
| 2021/0247817 A1* | 8/2021 | Hallar | E05D 11/1028 |
| 2022/0035422 A1* | 2/2022 | Torres | G06F 1/1681 |
| 2022/0147114 A1* | 5/2022 | Torres | G09F 9/301 |
| 2022/0253110 A1* | 8/2022 | Choi | G06F 1/1681 |

\* cited by examiner

PORTABLE INFORMATION HANDLING SYSTEM HINGE WITH HYBRID ROTATION FOR DISTRIBUTED TORQUE

BACKGROUND OF THE INVENTION

Field of the Invention

The present invention relates in general to the field of portable information handling systems, and more particularly to a portable information handling system hinge with hybrid rotation for distributed torque.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

One recent trend has replaced the keyboard of a convertible information handling system with a display. The display presents a keyboard when the housing rotates to a clamshell configuration so that an end user can type inputs at a touchscreen of the display. When the housing rotates 180 degrees to a planar tablet configuration, both displays are available to present visual images as a tablet. In particular, when a single flexible display film, such as a plastic organic light emitting diode (POLED) display film, is disposed over both housing portions, the tablet presentation provides visual images without a break between the two housing portions, such as over the hinge that rotationally couples the housing portions together. To provide such a tablet presentation, the POLED display film typically requires care where it folds over top of the hinge. Too sharp of a fold can damage the POLED film, such as with cracking; Too gentle of a fold results in a thicker device around the hinge in the closed configuration. Generally, the circumference of the display at the fold is managed by the shape of the hinge mechanism, which itself adds to the thickness of the housing. Larger hinge mechanisms reduce the advantages of flexible displays by increasing housing size and reducing system portability as screen footprint increases. Generally, the hinge has to have enough structure to provide stable torque and synchronized movement that avoids applying stress to the display film. In addition, the hinge has to adjust a length at the rotation of the display film so that the display is not stretched or compressed during rotation. Adapting to theses structural constraints tends to add size to the hinge.

SUMMARY OF THE INVENTION

Therefore, a need has arisen for a system and method which provides a portable information handling system hinge with hybrid rotation for distributed torque.

In accordance with the present invention, a system and method are provided which substantially reduce the disadvantages and problems associated with previous methods and systems for rotationally coupling portable information handling system housing portions. Dual synchronization mechanisms integrated in a hinge cooperate to translate rotation between housing portions with distribution of torsional forces so that distortions at a display film that folds at the hinge are reduced.

More specifically, a portable information handling system processes information with processing components disposed in a portable housing, such as a central processing unit that executes instructions to process information and a memory that stores the instructions and information. The portable housing has first and second housing portions rotationally coupled by a hinge integrating dual synchronization mechanisms to manage torsional forces translated by rotation of the housing portions to a display film disposed over the hinge. The hinge has first and second synchronized gears coupled at opposing ends of a main body, each synchronized gear having first and second sliding brackets that couple to the housing portions and a torque generator that resists rotational movement. The synchronized gears provide synchronized rotation of the housing portions at a variable distance from the hinge through sliding of the bracket relative to the hinge. The hinge also has first and second sets of first and second pivot arms that rotationally couple to the main body along first and second axes to set a distance between the housing portions and hinges that defines a radius at which a display film folds. Pivot arm synchronization is provided by engagement of side cam surfaces of each pivot arm and a sliding member having side cam surfaces that couples to the main body to slide in response to pivot arm rotation. The dual synchronization provided by the gears and sliding member helps to disperse torsional forces of rotation to avoid distortions at the display film.

The present invention provides a number of important technical advantages. One example of an important technical advantage is that a dual synchronization mechanism disperses torsional forces associated with rotation of housing portions to reduce distortions at a display film disposed over the hinge. Integrating a virtual pivot mechanism with cogwheel-type synchronizing gears distributes stress of torque in multiple points of a housing and hinge to reduce total thickness of the hinge. The worm-gear like synchronization of the sliding member between the pivot arms removes stress from synchronizing gears so that smaller gears may be used. As a result, the overall size of the hinge bar can be reduced and the entire thickness of a flexible display device may be thinner.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Portable information handling system housing stress associated with hinge rotation is distributed across dual hinge synchronization mechanisms to maintain a flexible display film. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
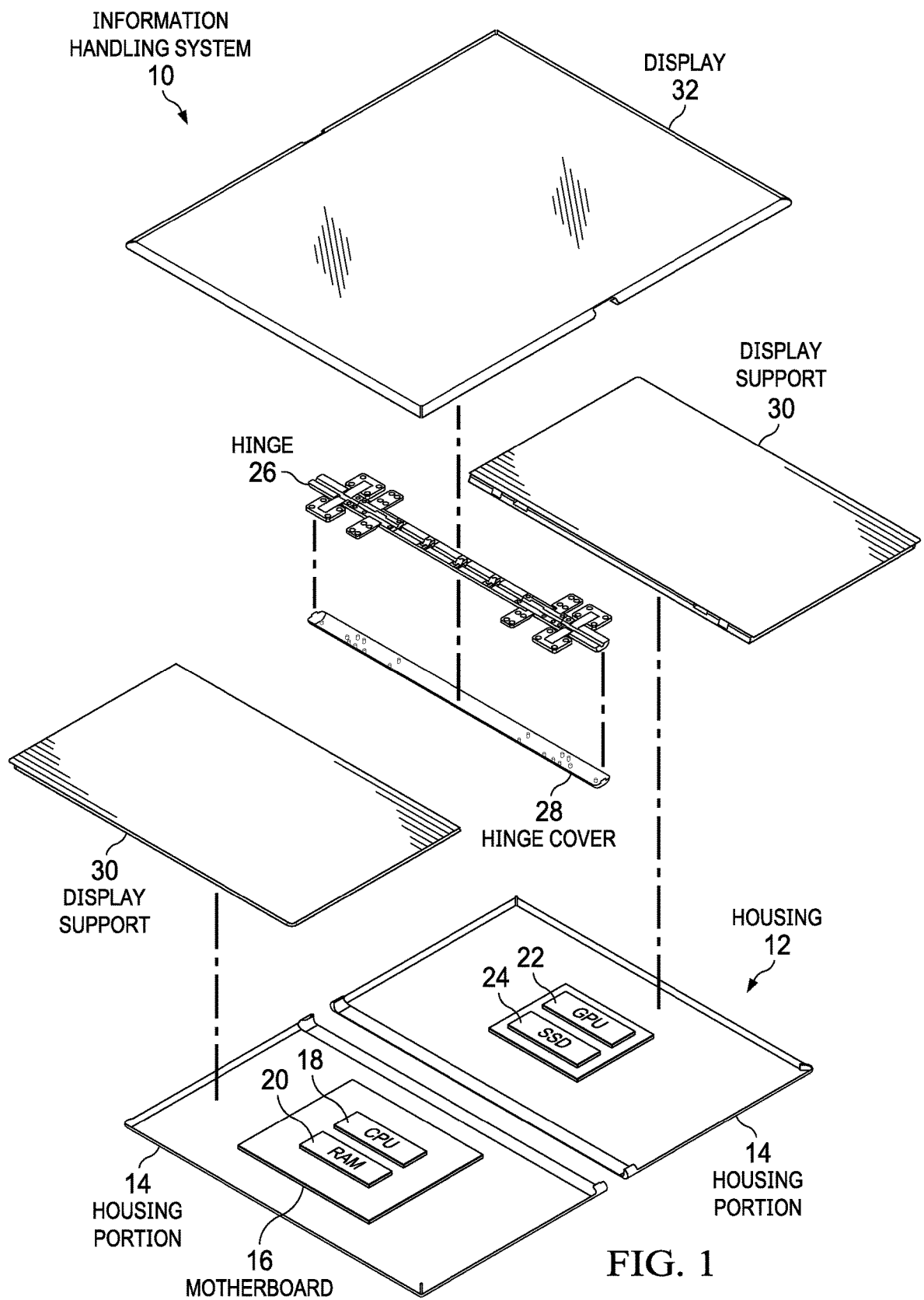
FIG. 1 depicts an upper perspective exploded view of a portable information handling system having a housing rotated to a tablet position.

Referring now to FIG. 1, an upper perspective exploded view depicts a portable information handling system 10 having a housing 12 rotated to a tablet position. Information handling system 10 has a portable housing 12 of opposing housing portions 14 rotationally coupled by a hinge 26 to rotate between the planar tablet position shown and a closed position having housing portions 14 rotated to a vertically stacked position and a display 32 folded into proximity with itself about hinge 26. In the example embodiment, portable information handling system 10 processes information with processing components that interface through a circuit board, such as a motherboard 16. A central processing unit (CPU) 18 executes instructions to process information in cooperation with a random access memory (RAM) 20 that stores the instructions and information. For example, an operating system and applications are retrieved from persistent memory of a solid state drive (SSD) 24 for execution to generate information. A graphics processor unit (GPU) 22 processes the information to define visual images, such as with pixel values that define colors for pixels of display 32 to present. In alternative embodiments, a variety of configurations of processing components may be used.

In the example embodiment, display 32 is a plastic organic light emitting diode (POLED) display film that extends across both housing portions 14 to fold at hinge 26 when housing 12 rotates to a closed position. Display supports 30 provide a firm surface under display 32 with hinge 26 disposed between and at a folding region of display 32. A hinge cover 28 couples to the rear side of hinge 26. Hinge 26 includes a dual synchronization mechanism that maintains a desired radius at the fold of display 32 to avoid damage to the display film. In addition, the dual synchronization mechanism distributes torsional stress introduced at rotation of housing portions 14 across hinge 26 so that display 32 is not subject to forces that can result in distortions to the film material.

Figure 2:
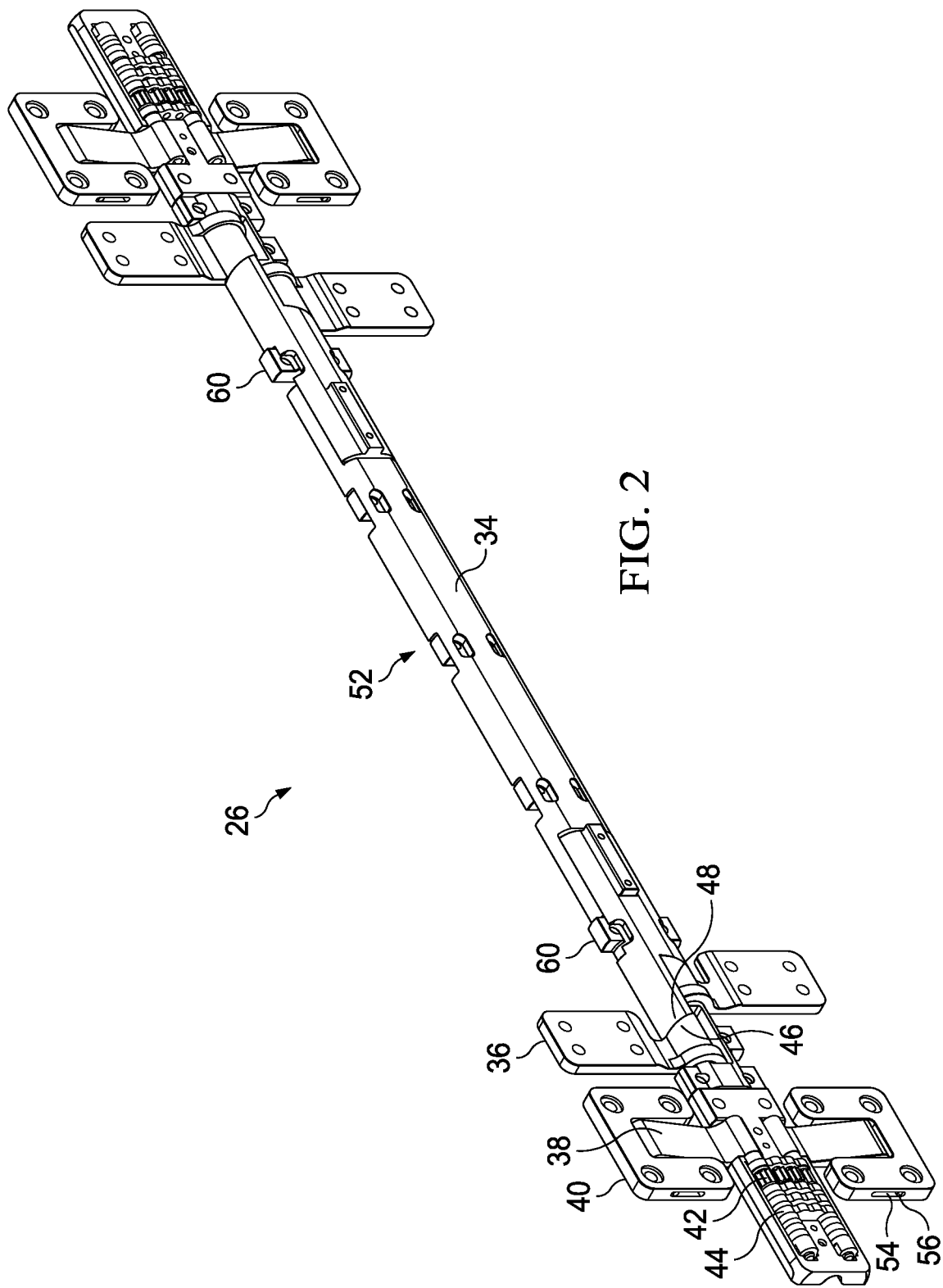
FIG. 2 depicts a lower perspective view of a hinge that rotationally couples housing portions.

Referring now to FIG. 2, a lower perspective view depicts a hinge 26 that rotationally couples housing portions. Hinge 26 has dual synchronization mechanisms coupled to a main body 52 that cooperate to manage torsional forces introduced at rotation. At each end of main body 52, a dual axle synchronized gear 42 provides synchronized rotation of the housing portions by translating rotation of each axle to the other through gear interactions. A support arm 38 fixedly couples to each axle of synchronized gear 42 and slidingly couples to a sliding bracket 40 that fixedly couples to a housing portion, such as with screws. For example, sliding bracket 40 includes a slot 54 that accepts a pin 56 coupled to support arm 38 so that bracket 40 slides relative to support arm 38 to adjust the length between the axle of synchronized gear 42 and a housing portion coupled to sliding bracket 40. As a housing portion is rotated, the rotational movement is translated from sliding bracket 40 through support arm 38 to synchronized gear 42, which applies synchronized rotation to the opposing housing portion. Rotational forces applied at a housing portion translate to the other housing portion through each of the synchronized gears 42 coupled to the opposing ends of main body 52. In addition, each synchronized gear 42 has a torque generator 44 coupled to the axles of the synchronized gear to resist rotation, such as to hold the housing portions in a relative orientation when rotational force is not applied at the housing.

Synchronized gears 42 provide one "cogwheel" type of synchronization mechanism for the housing; a second synchronization mechanism is provided by a "pivot" hinge that uses a worm-gear type of sliding relationship to distribute torsion associated with housing rotation across the housing portions, thereby reducing destructive forces applied to a display film. In the example embodiment, first and second sets of pivot arms 36 rotationally couple to main body 52 proximate each of synchronized gears 42. Each pivot arm rotates about an axis substantially aligned with one of the axes of synchronized gears 42 and fixedly couples to a housing portion, such as with screws. Pivot arms 36 define a radius within hinge 26 about which the display film folds.

For example, pivot arms 36 rotate about an outer circumference of main body 52 to have the effect of increasing and decreasing the distance of an attached housing portion to main body 52 as the housing portions rotate between closed and tablet positions. The variable distance of the housing portions adjusts the housing portion relative positions to achieve a desired fold radius of the display film, which itself must adapt to a smaller circumference at the inner surface of the closed position relative to the housing portions. The precise housing portion spacing may be adapted as needed with adjustments to rotation of pivot arms 36 relative to main body 52. As housing portion spacing relative to hinge 26 changes, sliding bracket 40 adjusts its length relative to hinge 26 by sliding relative to support arm 38. In effect, pivot arms 36 define spacing of the housing portions while sliding brackets 40 adjust to the spacing and provide synchronized motion translation and torque that resists rotation. The translation by synchronized gears 42 of rotation of the housing portions is provided across a housing portion and to the other housing portion through the interaction of the gears and axles as described above.

The robustness of the relative relationship of the housing portions during rotation about hinge 26 is further enhanced by synchronization of the rotation of pivot arms 36. Synchronization of pivot arms 36 is accomplished with a sliding member 34 coupled to main body 52 that has a cam side surface 48 engaged with a cam side surface 46 of each pivot arm 36. As a pivot arm rotates, such as with translation of rotational force from a housing portion, the engagement of side surface cams 46 and 48 act on sliding member 34 to slide along main body 52 within constraints defined by extension members 50 that extend from main body 52 into slots of sliding member 34. As sliding member 34 slides in response to rotation of a pivot arm 36, the sliding motion translates to other pivot arms 36 through each pivot arm's side cam surface engagement with sliding member 34. As a result, hinge 26 includes a dual-type of synchronization mechanisms that distribute torsional forces associated with rotation of the housing portions so that reduced stress is generated at the display film as it folds over hinge 26.

Figure 3:
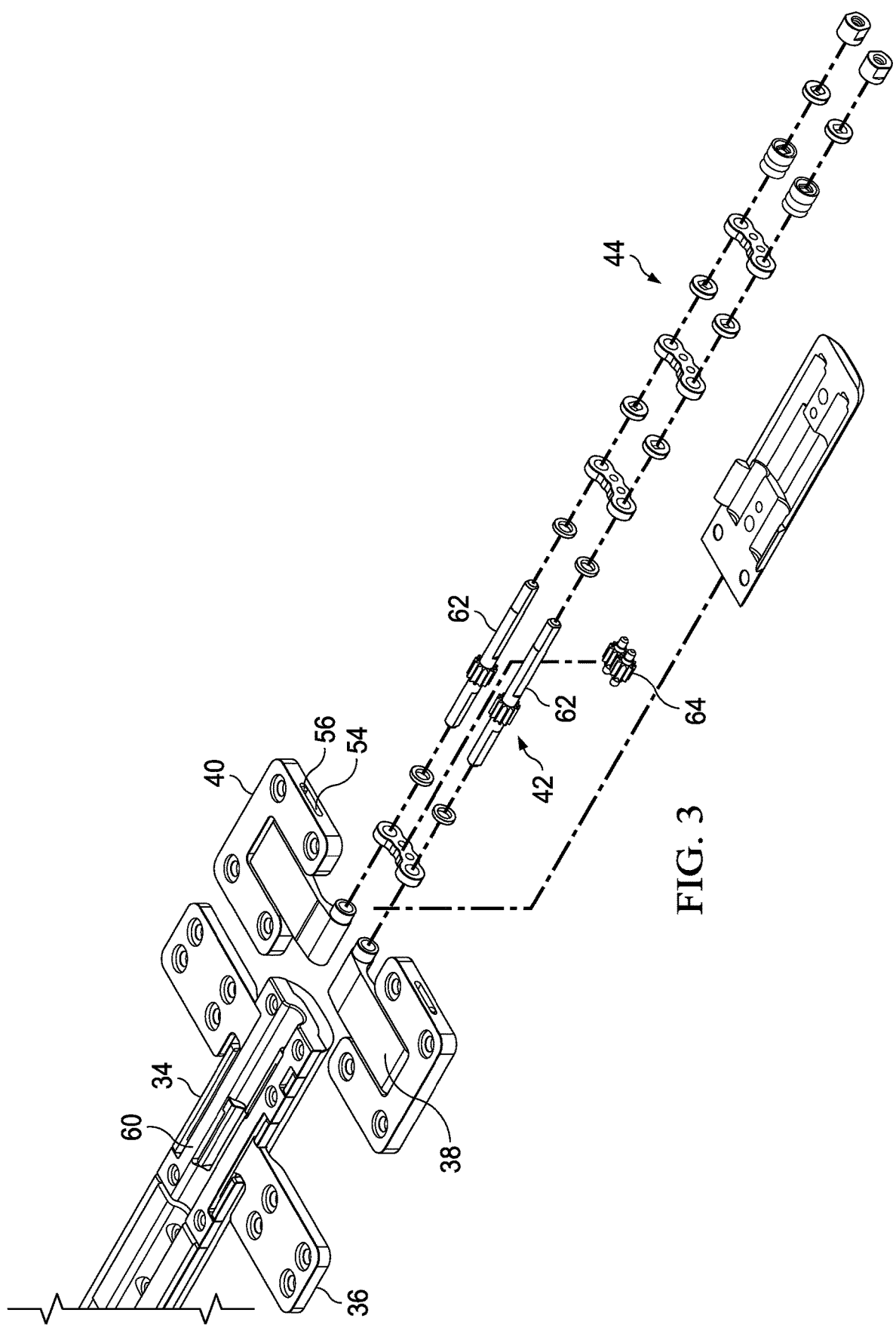
FIG. 3 depicts an upper perspective exploded view of a hinge that rotationally couples housing portions.

Referring now to FIG. 3, an upper perspective exploded view depicts a hinge 26 that rotationally couples housing portions. Synchronized gear 42 translates rotation between two parallel spaced axles 62 with idler gears 64 and couples the axles to torque generator 44 and support arms 38 so that both support arms 38 rotate in an opposite and synchronized manner. Sliding bracket 40 couples to support arms 38 with a pin 56 engaged through a slot 54 so that the length of sliding bracket 40 relative to synchronized gear 42 can adjust freely within the constraint defined by slot 54. The synchronized gear 42 assembles to the end of main body 52. Pivot arms 36 fit into a guide 60 formed in main body 52 that defines its rotational motion. The rotational motion of pivot arms 36 maintain a desired spacing of housing portions, such as by having an elliptical path relative to rotation of the axles 62 of synchronized gear 42. Although pivot arms 36 generally rotate about the parallel spaced axes defined by synchronized gears 42, variations to the rotational arc applied by pivot arms 36 to achieve a desired display film radius are adjusted with sliding of bracket 40.

Figure 4:
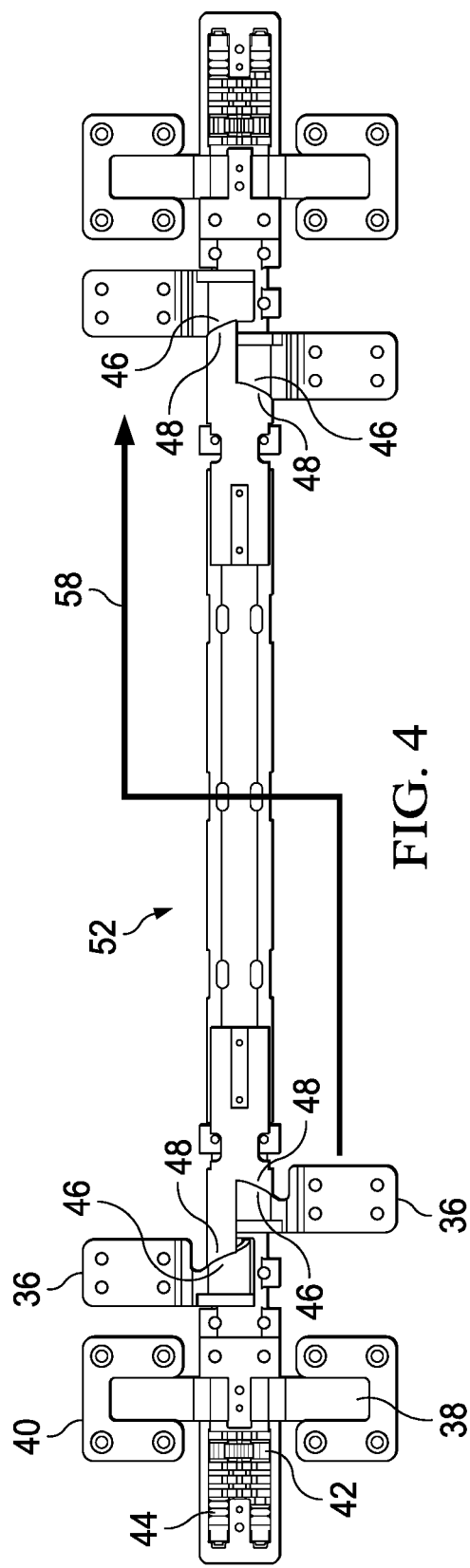
FIG. 4 depicts a bottom view of a hinge that rotationally couples housing portions.

Referring now to FIG. 4, a bottom view depicts a hinge 26 that rotationally couples housing portions. As is described above, synchronized gears 42 on opposing ends of main body 52 work with torque generators 44 to provide synchronized motion of housing portions coupled at each sliding bracket 40 and support arm 38. In addition, pivot arms 36 and sliding member 34 engage at cam side surfaces so that rotation of a pivot arm 36 translates to other pivot arms by a sliding motion of sliding member 34. The arrowed line 58 depicts how translational forces is communicated between pivot arms 36 on opposite sides of main body 52 based upon the orientation of the cam side surfaces 46 and 48. The pivot arms on each side of main body 52 have cam side surfaces with a parallel alignment so that translation of rotational force tends to cross to the opposite side of hinge 26 as indicated by arrowed line 54. This force translation vector tends to reduce torsion across hinge 26 for less distorting at a display film folded over hinge 26.

Although the present invention has been described in detail, it should be understood that various changes, substitutions and alterations can be made hereto without departing from the spirit and scope of the invention as defined by the appended claims.

What is claimed is:

1. An information handling system comprising:
    a housing having first and second housing portions;
    a processor disposed in the housing and operable to execute instructions to process information;
    a memory disposed in the housing and operable to store the instructions and information;
    a display interfaced with the processor and operable to present the information as visual images; and
    a hinge rotationally coupling the first and second housing portions to rotate between closed and tablet positions, the hinge having a main body, the main body having first and second synchronized gears coupled at opposing ends, each of the first and second synchronized gears having first and second axles aligned with first and second parallel spaced axes, each synchronized gear axle coupled to the housing, a sliding member coupled to the main body between the opposing ends, and first and second sets of first and second pivot arms, each of the first and second sets rotationally coupled to the main body and having a cam side surface that engages a cam side surface of the sliding member to translate rotation between the first set of the pivot arms and the second set of pivot arms through the sliding member.

2. The information handling system of claim 1 wherein the display comprises a plastic organic light emitting diode film disposed across both of the first and second housing portions to fold at the hinge.

3. The information handling system of claim 1 further comprising a sliding bracket coupling each synchronized gear to one of the first or second housing portions, the sliding bracket having a support arm rotating with the synchronized gear axle and a bracket that slides relative to the support and fixedly couples to the housing portion.

4. The information handling system of claim 3 wherein the bracket has a slot that engages a pin extending from the support arm, the slot.

5. The information handling system of claim 4 further comprising a torque generator coupled to each synchronized gear and resisting rotation of the first and second axles.

6. The information handling system of claim 1 wherein:
    each of the first pivot arms rotationally couples to the main body to rotate about the first axis; and
    each of the second pivot arms rotationally couples to the main body to rotate about the second axis.

7. The information handling system of claim 6 wherein:
    the cam side surfaces of the first pivot arms align; and
    the cam side surfaces of the second pivot arms align.

8. The information handling system of claim 7 wherein:
    the first pivot arms couple to the first housing portion; and the second pivot arms couple to the second housing portion.

9. The system of claim 8 wherein a fixed position of the first pivot arm relative to the first housing portion and first axis defines a sliding position of the sliding bracket.

\* \* \* \* \*